United States Patent [19]

Graindorge

[11] Patent Number: 4,994,677

[45] Date of Patent: Feb. 19, 1991

[54] METHOD FOR POSITIONING AN OBJECT RELATIVE TO A PLANE AND MEASURING LENGTH AND APPARATUS FOR IMPLEMENTING SAME

[75] Inventor: Philippe Graindorge, Crimolois, France

[73] Assignee: Photonetics, S.A., Marly Le Roi, France

[21] Appl. No.: 349,223

[22] Filed: May 9, 1989

[30] Foreign Application Priority Data

May 11, 1988 [FR] France ............................ 88 06413

[51] Int. Cl.[5] .......................................... G01B 11/02
[52] U.S. Cl. ................................. 250/560; 250/561; 356/387
[58] Field of Search ................... 250/560, 561, 548; 356/386, 387, 383, 375

[56] References Cited

U.S. PATENT DOCUMENTS

| | | | |
|---|---|---|---|
| 4,007,992 | 2/1977 | Petrohilos et al. | 356/387 |
| 4,332,475 | 6/1982 | Demarest | 250/560 |
| 4,492,473 | 1/1985 | Richter et al. | 356/386 |

*Primary Examiner*—Edward P. Westin
*Attorney, Agent, or Firm*—Mason, Fenwick & Lawrence

[57] ABSTRACT

A method of positioning an object relative to a plane, and apparatus therefor. According to the method, the plane is swept by the axis of a light-beam between a source assembly and a detection assembly, and the object is translated approximately perpendicularly to the plane, the detection assembly emitting a signal representative of the light received and therefore, the position of the object relative to the plane. The signal emitted by the detection assembly is measured as a function of time, the translation of the object being halted when the signal has a particular form. The particular form of the signal corresponds to the position of the object in which the shoulder masks a predetermined fixed part of the light-beam during part of its sweep. The apparatus comprises the source assembly for producing the light-beam, a deflecting member for angularly deflecting the light-beam, a first optical system for causing the deflected light-beam to sweep a plane parallel to the light-beam, the detection assembly, a second optical system for focusing the deflected light-beam onto the detection assembly. An electronic processor processes the signal emitted by the detection assembly as a function of time. The deflecting member is placed at the focus of the first optical system and the detection assembly is placed at the focus of the second optical system.

15 Claims, 3 Drawing Sheets

METHOD FOR POSITIONING AN OBJECT RELATIVE TO A PLANE AND MEASURING LENGTH AND APPARATUS FOR IMPLEMENTING SAME

FIELD OF THE INVENTION

The present invention relates to a method of positioning an object relative to a plane, a method of measuring length and the devices for implementing these methods.

BACKGROUND OF THE INVENTION

It is frequently necessary in industry to position an object with a high degree of accuracy relative to a plane. This can be necessary during the machining of a single piece or during the assembly of a plurality of pieces. Such a positioning carried out at two different points likewise makes it possible to measure the length separating these two points.

The methods of positioning and measuring objects by optical means are conventional. In most cases these methods comprise locating points on the object concerned by means of optical peaks. Measurements of length are obtained either relative to fixed marks or relative to mobile marks.

More recently, for example in U.S. Pat. No. 4,332,475, it has been proposed that the dimensions of an object should be measured by sweeping it with a light-beam and measuring the time taken by the beam to pass from one of the edges of the object to the other.

This last-named method of measurement is limited to objects whose dimensions are inferior to the amplitude of the sweep of the beam, and further limited in that the detection of the objects comprises an area of uncertainty due to the width of the beam performing the said sweep.

SUMMARY OF THE INVENTION

The object of the present invention is a method for positioning an object relative to a plane by sweeping a light-beam which enables a positioning accuracy to be achieved which is substantially narrower than the diameter of the sweeping beam.

A further object of the invention is to make it possible to measure the length of an object between two shoulders without being limited by the amplitude of the sweep of the light-beam.

To this end, the method for positioning an object relative to a plane, according to the invention, is of the type in which the plane is swept by a light-beam between a source assembly and a detection assembly, the object is translated approximately perpendicular to the plane, the signal received is measured as a function of time, and the translation of the object is halted when the signal received has a particular form.

For reasons of simplification, the plane swept by the axis of the light-beam will here be called the plane swept by the light-beam.

According to the invention, the object possesses a shoulder and the required particular form of the signal received corresponds to the position in which the shoulder masks a predetermined fixed part of the light-beam during part of the sweep of the light-beam.

According to another feature, the invention relates to a method of measuring the length of an object between two shoulders, in which method the first shoulder is positioned relative to a plane, the object is displaced perpendicularly to the plane until the second shoulder is positioned relative to the plane, and the length of the displacement of the object which is equal to the desired length is measured. Successive positionings of the shoulders are performed in accordance with the method set out above.

The invention likewise relates to a device for implementing the methods according the invention in which a light source produces a parallel beam, a member for the angular deflection of this beam placed at the focus of an optical system produces the sweeping of the beam parallel to itself, and a receiver placed at the focus of an optical system emits a signal which is a function of the light intensity received. The device also comprises electronic means for processing the signal emitted by the receiver as a function of time, and a support intended to receive an object and to permit its displacement perpendicularly to the sweeping plane of the beam.

BRIEF DESCRIPTION OF THE DRAWING

The invention will be described in more detail with reference to the figures, in which.

DETAILED DESCRIPTION OF THE PREFERRED EMBODIMENTS

Figure 1:
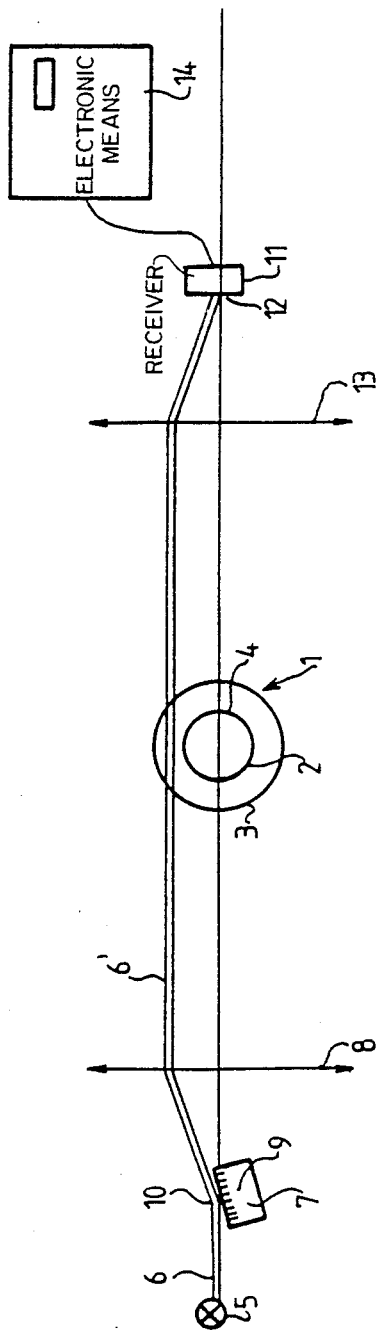
FIG. 1 is an elevational view of the complete installation.
Figure 2:
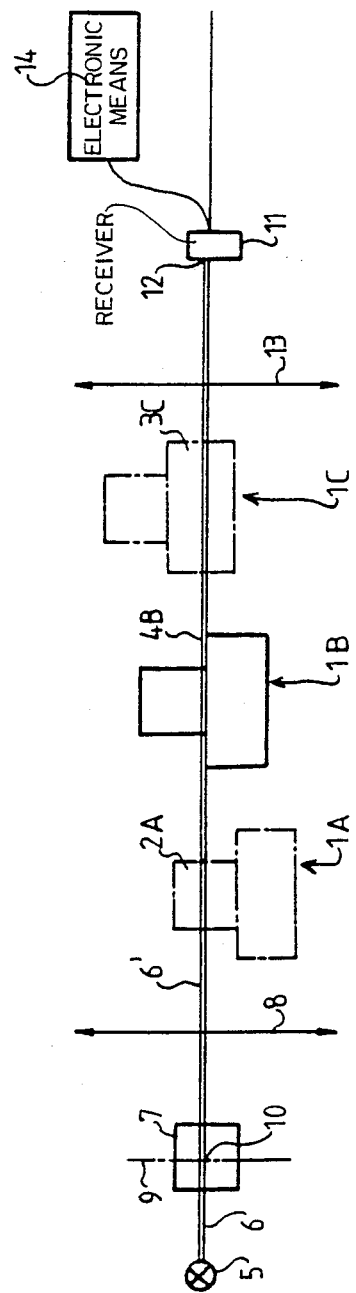
FIG. 2 is a plan view of the complete installation.

FIGS. 1 and 2 show a general view of the measuring device. The object 1 is made up of two parts, 2 and 3 respectively, separated by a shoulder 4.

In practice, the object 1 often possesses a symmetry of revolution, but it may have any other shape provided that it comprises an element, to be defined below, capable of fulfilling the function attributed to the shoulder 4.

A light source 5, for example a laser source, produces a parallel beam 6. This beam reaches a deflecting member 7 placed at the object focus 10 of an optical system 8. The deflection member 7 is, for example, a mirror which can be moved about an axis 9, thus, ensuring the movement of the deflection member 7. The light-beam sweeps a plane which is the plane of the sheet containing FIG. 1 and which, by contrast, is seen in section in FIG. 2. The focus 10 of the optical system 8 merges with the point of incidence of the light-beam 6 on the mobile deflection member 7. The sweep of this beam 6, on the other side of the optical system 8, therefore takes place parallel to itself. A receiver 11 is placed at the image focus 12 of the optical system 13 whose optical axis is substantially merged with that of the optical system 8. Thus, whatever may be the position of the light-beam 6', it will be received by the receiver 11 on condition that it has not been masked. Electronic means 14 make it possible to process the signal and extract the desired measurement. The object 1 is carried by a support which enables it to be displaced perpendicularly to the sweeping plane of the beam. However, the object is fixed during a measuring sweep of the beam 6'. The object has been shown in FIG. 2 in three successive positions A, B, C, as it advances.

In the two extreme situations, A and C, the light-beam 6', during its sweep, initially meets no obstacle, the receiver 11 therefore transmits a signal of maximum amplitude to the electronic means 14, then it encounters the edge of the object at 2A and 3C respectively, which produces the masking of the beam 6' and hence the emission of a minimum signal by the receiver 11 before reappearing at the end of the masking. The sweeping rate of the beam 6' being constant, the period of masking corresponding to the length of time for which the receiver 11 emits a minimum signal is proportional to the dimension of the object in the sweeping plane and parallel to the direction of the sweep (that is to say, substantially perpendicular to the direction of the beam). In a known manner, the measurement of this masking period thus makes it possible to measure the dimension of the object in the sense stated above.

We shall dwell in more detail on the situation where the object 1 is in position 1B, in which, during its sweep, the beam 6' is liable to be partially masked by the shoulder 4B.

Figure 3:
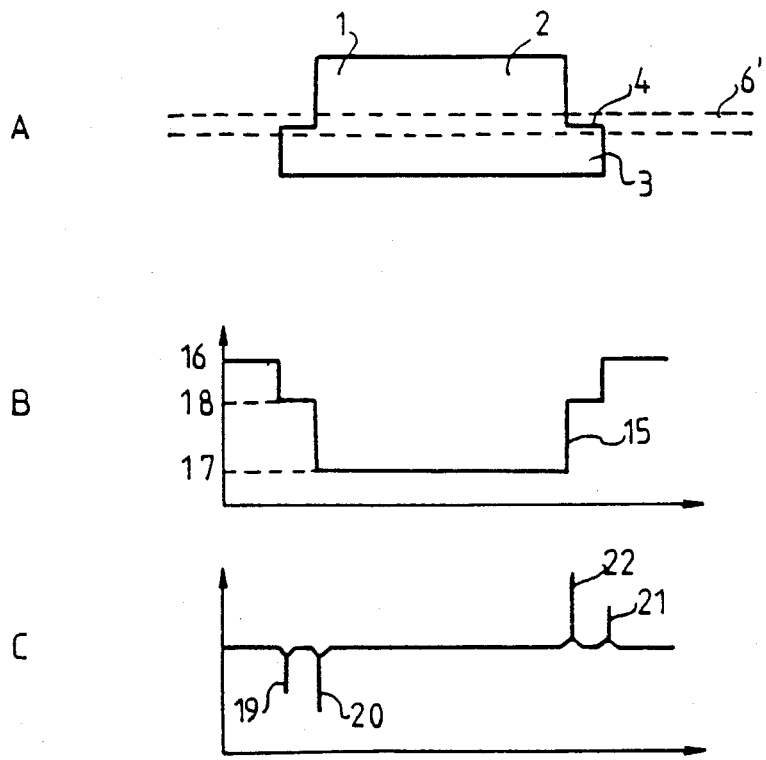
FIG. 3 is a representation of the signal received and of its derivative when the shoulder of the object is in the vicinity of the plane swept by the light-beam.

In FIG. 3 the situation is shown in detail: the object 1 and the light-beam 6' are shown at A, the signal 15 emitted by the receiver 11 is shown at B, and its derivative at C.

During a sweep of the beam 6' at the level of the shoulder 4, starting for example from the top in the view shown in FIG. 1, the signal is first maximum at its level 16, then it is partially masked at the level of the shoulder 3, as shown at A, and supplies an intermediate level signal 18, then it is completely masked at the level of the part 2 of the piece and the signal supplied is then the minimum signal 17. Subsequently, in the lower part of the piece, the situation is reversed. When light-beam 6' no longer traverses the part 2 of the piece but only the shoulder at the level of the part 3, it is partially masked and thus supplies a mean level signal 18, and then, when it is no longer masked by the piece at all, a maximum value signal 16.

In a conventional manner, the derivative of this signal B is shown as C. It is made up of two negative Dirac peaks 19 and 20 and two positive peaks 21 and 22.

Figure 4:
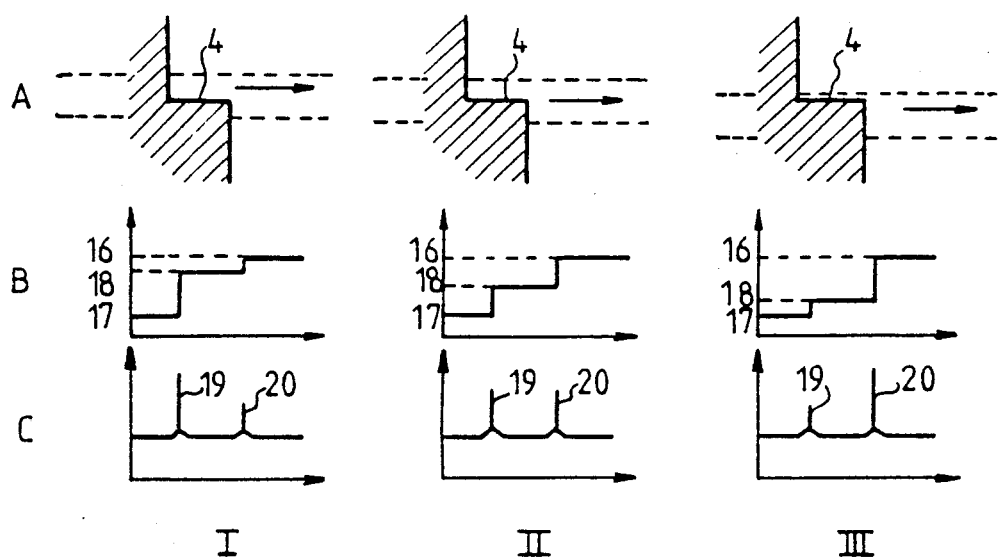
FIG. 4 shows different types of received signals and their derivatives as a function of the position of the shoulder relative to the swept plane.

FIG. 4 shows the elements analogous to those in FIG. 3 for differing degrees of advance, I, II, III of the object 1 relative to the plane swept by the light-beam 6' at the moment of sweeping. In these different situations, the maximum 16 and minimum 17 levels are unchanged, but the intermediate level 18 is a function of the position of the object 1.

The equality of two peaks 19 and 20 present in the derivative makes it possible to define the position of the object precisely relative to the sweeping plane and to ensure good reproducibility of that position.

By way of example, a precision of 2 μm for the position of the object 1 was obtained when the light-beam was a laser beam having a diameter of 0.1 mm.

The peaks 19, 20 are obtained in the derivative once the signal itself exhibits clear breaks in level. The shoulder to which reference is made in this text comprises any means attached to the object 1 which makes it possible to produce this type of break during the sweep of the beam 6'. Thus, in a body of revolution, such a means could be an abrupt change in diameter, but a similar result can likewise be obtained by numerous other means produced either by the shape of the object itself or by a piece attached to the object itself. These means produce a partial masking of the light-beam 6' which is constant for a given sweep and varies with the position of the object. The transitions during a sweep from complete transmission (absence of masking) to partial masking and then to total masking must be clear-cut.

The equality of the amplitude of the two peaks 19, 20 of the derivative of the signal corresponds to the position in which the shoulder 4 of the object is substantially in the middle of the light-beam 6', since in this case the mean amplitude 18 of the signal is equidistant from the minimum amplitude 17 and from the maximum amplitude 16. It will be understood that, without departing from the scope of the invention, a ratio between the amplitudes of these two peaks 19, 20 which is other than equality may be selected, provided that it is constant and remains significant. When this ratio other than 1 is achieved, the shoulder of the object 4 is then located in a plane of reference which is slightly offset relative to the plane swept by the axis of the light-beam 6'.

Figure 5:
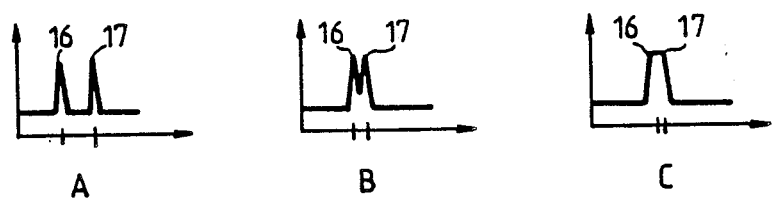
FIG. 5 shows different forms of derivatives of the signal, contained as a function of the size of the shoulder.

Situations may be encountered in which the shoulder 4 of the object 1 has a small amplitude and in particular may be less than the diameter of the light-beam 6'. The derivative of the signal then takes the form shown in FIG. 5 at B or C, that is to say the form produced by the moving together of two peaks 16, 17 whose bases come to merge. These conditions likewise make it possible to position the object 1 appropriately.

Whatever may be the amplitude of the shoulder relative to the diameter of the light-beam, and hence the form of the signal, the position in which the shoulder of the object is in the sweeping plane of the beam is the position for which the maximum derivative of the signal during a sweep is lowest relative to the maxima obtained in the other sweeps. This detection of the relative minimum of the maximum derivative of the signal thus makes it possible under all circumstances to ensure accurate and reliable positioning of the object 1.

The method of sweeping employed to ensure the positioning of the object makes it readily possible, as has been seen above, to measure the dimension of the piece perpendicularly to the direction of the light-beam and in the plane of sweeping of the latter. This type of measurement at different levels of the piece may thus easily be carried out simultaneously with the positioning of the piece.

The invention likewise relates to a method of measuring the length of an object between two shoulders 4. According to this method, a first shoulder 4 of the object is positioned relative to the measuring light-beam in accordance with the positioning method set out above, then the support carrying the object 1 is caused to advance in the direction perpendicular to the sweeping plane of the beam 6' until the positioning of a second shoulder relative to the sweeping plane of the beam is achieved. The distance by which the support has advanced, measured by any means, for example relative to a reference ruler, supplies the distance between the two shoulders with an accuracy dependent on the accuracy obtained in positioning one shoulder.

Figure 6:
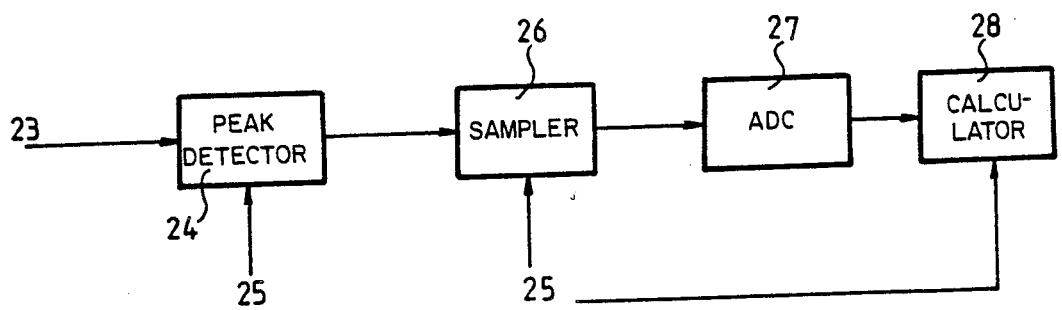
FIG. 6 shows one of the possible methods of processing the signal received.

The functions performed by the electronic means for processing the signal supplied by the photodetector are preferably those shown in FIG. 6: the derivative 23 of the signal is analysed by a peak detector 24 which, on each sweep, supplies the value of the maximum of the derivative to a sampler 26. An analog/digital converter 27 then transmits its values to the calculator 28 which controls the displacements of the support of the object 1. The start and the finish of each sweep of the light-beam 6' are detected in the form of a signal 25 and cause the operation to be repeated by activating the peak detector 24 and resetting the sampler 26 to 0.

The calculator memorizes the value of the maximum of the derivative for each sweep. It controls the support of the object 1 until this value is minimized.

In an alternative embodiment, it is likewise possible to envisage that the calculator 28 directly exploits the signal supplied by the photoelectric receiver 11, rather than its derivative. It then controls the support of the object 1 in a manner such that the value of the mean signal 18 is as close as possible to the mean value between the minimum signal 17 and the maximum signal 16. To this end, the sampler 26 utilizes values of the signal measured on either side of each peak of the derivative of the signal.

Thus, the values exploited by the calculator 28 on each sweep are those obtained on either side of the peaks detected by the detector 24 provided for that purpose.

I claim:

1. A method of positioning an object relative to a plane, the object having a shoulder, comprising the steps of:
    (a) providing a source assembly for producing a light-beam and a detection assembly for receiving the light-beam and emitting a signal which is a function of the light received;
    (b) while the object is fixed, sweeping the light-beam to define a plane between the source assembly and the detection assembly, the signal emitted by the detection assembly being a function of the position of the object;
    (c) translating the object approximately perpendicularly to the plane to place the object in successive positions for successive sweeps of the light-beam, and repeating said step (b) to cause a variation in the signal emitted by the detection assembly;
    (d) measuring the signals emitted by the detection assembly as a function of time for successive sweeps of the light-beam and successive positions of the object;
    (e) halting the translation of the object when the signal as measured in said step (d) has a particular form which corresponds to a position of the object in which the shoulder masks a predetermined fixed part of the light-beam during part of the sweep of the light-beam.

2. The method of claim 1, wherein said step (d) comprises determining the derivative of the signal as a function of time, and wherein said step (e) comprises halting the translation of the object when the derivative of the signal as a function of time has a particular form which corresponds to a position of the object in which the shoulder masks a predetermined fixed part of the light-beam during part of the sweep of the light-beam.

3. The method of claim 2, wherein in said step (d), the derivative of the signal as a function of time possesses two peaks, each of the two peaks having an amplitude, and wherein in said step (e), a given ratio of the amplitudes of the two peaks defines the particular form which corresponds to a position of the object in which the shoulder masks a predetermined fixed part of the light-beam during part of the sweep of the light-beam.

4. The method of claim 3, wherein in said step (e), the ratio of the amplitudes of the two peaks is 1:1.

5. The method of claim 2, wherein in said step (d), the derivative of the signal as a function of time comprises a peak representing a maximum, and wherein the position of the object in which the shoulder masks a predetermined fixed part of the light-beam during part of the sweep of the light-beam corresponds to the position for which the maximum derivative of the signal during a sweep is lowest relative to the maxima obtained in the other sweeps.

6. The method of claim 2, wherein in said step (d), the derivative of the signal as a function of time comprises a relative minimum between two maxima, and wherein the position of the object in which the shoulder masks a predetermined fixed part of the light-beam during part of the sweep of the light-beam corresponds to the position for which the maximum derivative of the signal during a sweep is lowest relative to the maxima obtained in the other sweeps.

7. The method of claim 2, wherein the detection assembly emits a signal of maximum level when the light-beam is not masked by the object and a signal of minimum level when the light-beam is masked by the object, and wherein in said step (e), the position of the object in which the shoulder masks a predetermined fixed part of the light-beam during part of the sweep of the light-beam corresponds to the position for which the signal emitted in said step (b) has an intermediate level equidistant from the maximum and minimum levels.

8. The method of claim 7, wherein each change in the level of the signal during one sweep of the light-beam corresponds to a peak in the derivative of the signal, the measurement of the level of the signal being carried out on either side of each peak.

9. The method of claim 1, wherein in said step (b), the light-beam is displaced parallel to itself.

10. The method of claim 9, further comprising the step of:
    (f) measuring the dimension of the object in the direction of the plane and perpendicular to the direction of the light-beam, using the signal emitted by the detection assembly.

11. A method of measuring the length of an object between first and second shoulders of the object, comprising the steps of:
    (a) providing a source assembly for producing a light-beam and a detection assembly for receiving the light-beam and emitting a signal which is a function of the light received;
    (b) while the object is fixed, sweeping the light-beam to define a plane between the source assembly and the detection assembly, the signal emitted by the detection assembly being a function of the position of the object;
    (c) translating the object approximately perpendicularly to the plane to place the object in successive positions for successive sweeps of the light-beam, and repeating said step (b) to cause a variation in the signal emitted by the detection assembly;
    (d) measuring the signals emitted by the detection assembly as a function of time for successive sweeps of the light-beam and successive positions of the object;
    (e) halting the translation of the object when the signal as measured in said step (d) has a particular form which corresponds to a position of the object in which the first shoulder masks a predetermined fixed part of the light-beam during part of the sweep of the light-beam;

(f) translating the object in a direction perpendicular to the plane and repeating said steps (b) through (d);

(g) halting the translation of the object when the signal as measured in said step (d) has a particular form which corresponds to a position of the object in which the second shoulder masks a predetermined fixed part of the light-beam during part of the sweep of the light-beam; and (h) measuring the distance the object has advanced between said steps (e) and (g).

12. A device for positioning an object having a shoulder relative to a plane, comprising:

light source means for producing a parallel light-beam;

deflecting means for angularly deflecting the light-beam;

first optical system means for causing the deflected light-beam to sweep a plane parallel to the light-beam, said first optical system means having a focus, and said deflecting means being placed at said focus;

receiver means for receiving the light-beam and emitting a signal which is a function of the intensity of light received;

second optical system means for focusing the deflected light-beam onto said receiver means, said second optical system means having a focus, and said receiver means being placed at said focus;

electronic means for processing the signal emitted by the receiver as a function of time; and support means for receiving the object and displacing the object perpendicular to the plane until the shoulder masks a predetermined fixed part of the light-beam during part of the sweep of the light-beam.

13. The device of claim 12, wherein said light source means is a laser.

14. The device of claim 12, wherein said electronic means comprises digitizing means for digitizing the signal.

15. The device of claim 12, said support means being displaceable with the object, and wherein said device further comprises measurement means for measuring the displacement of said support means.

* * * * *